(12) United States Patent
Lee et al.

(10) Patent No.: US 11,729,852 B2
(45) Date of Patent: Aug. 15, 2023

(54) METHOD FOR CONTROLLING ESTABLISHMENT OF CONNECTION BETWEEN DEVICES BY USING SHORT-RANGE WIRELESS COMMUNICATION IN WIRELESS COMMUNICATION SYSTEM, AND APPARATUS THEREFOR

(71) Applicant: LG ELECTRONICS INC., Seoul (KR)

(72) Inventors: Hyeonjae Lee, Seoul (KR); Jonghun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 17/432,761

(22) PCT Filed: Feb. 21, 2020

(86) PCT No.: PCT/KR2020/002557
§ 371 (c)(1),
(2) Date: Aug. 23, 2021

(87) PCT Pub. No.: WO2020/171653
PCT Pub. Date: Aug. 27, 2020

(65) Prior Publication Data
US 2022/0151007 A1     May 12, 2022

(30) Foreign Application Priority Data

Feb. 21, 2019    (KR) ........................ 10-2019-0020759

(51) Int. Cl.
*H04B 7/00*      (2006.01)
*H04W 76/19*    (2018.01)
(Continued)

(52) U.S. Cl.
CPC ............. *H04W 76/19* (2018.02); *H04W 4/80* (2018.02); *H04W 48/02* (2013.01); *H04W 76/14* (2018.02)

(58) Field of Classification Search
CPC ....... H04W 76/19; H04W 76/14; H04W 4/80; H04W 48/02
See application file for complete search history.

(56) References Cited

U.S. PATENT DOCUMENTS 9,183,560 B2 * 11/2015 Abelow ............. G06Q 30/0601
11,222,298 B2 * 1/2022 Abelow ............... G06Q 10/067
(Continued)

FOREIGN PATENT DOCUMENTS

JP       2015515796     5/2015
KR      101006417      1/2011
(Continued)

*Primary Examiner* — April G Gonzales
(74) *Attorney, Agent, or Firm* — Bryan Cave Leighton Paisner LLP

(57) ABSTRACT

A method for a control device to control a connection between a first device and a second device using short-range wireless communication, the method comprising: transmitting, to the first device, a first message including a first operation code for reconnection after an initial connection between the first device and the second device is established, wherein the first operation code includes a first code instructing storage of an address of the second device in a first white list including addresses of devices connected to the first device at least once; transmitting, to the second device, a second message including a second operation code for the reconnection, wherein the second operation code includes a second code instructing storage of an address of the first device in a second white list including addresses of devices connected to the second device at least once; and instructing the first device and the second device to form a connection between the first device and the second device, (Continued)

wherein each of the first white list and the second white list includes addresses of devices connected without the control device when a connection is released after the initial connection.

10 Claims, 13 Drawing Sheets

(51) Int. Cl.
*H04W 76/14* (2018.01)
*H04W 4/80* (2018.01)
*H04W 48/02* (2009.01)

(56) References Cited

U.S. PATENT DOCUMENTS

| | | | |
|---|---|---|---|
| 2012/0069131 A1* | 3/2012 | Abelow | G06Q 30/0601 |
| | | | 345/589 |
| 2015/0304803 A1* | 10/2015 | Chen | H04W 52/0209 |
| | | | 455/41.2 |
| 2016/0086108 A1* | 3/2016 | Abelow | G06Q 30/02 |
| | | | 705/7.29 |
| 2017/0195447 A1* | 7/2017 | Panagos | H04L 67/5682 |
| 2018/0042061 A1* | 2/2018 | Iinuma | H04W 76/10 |

FOREIGN PATENT DOCUMENTS

| | | |
|---|---|---|
| KR | 1020120059547 | 6/2012 |
| KR | 1020160119722 | 10/2016 |
| WO | 2018135926 | 7/2018 |

\* cited by examiner

[FIG. 1]
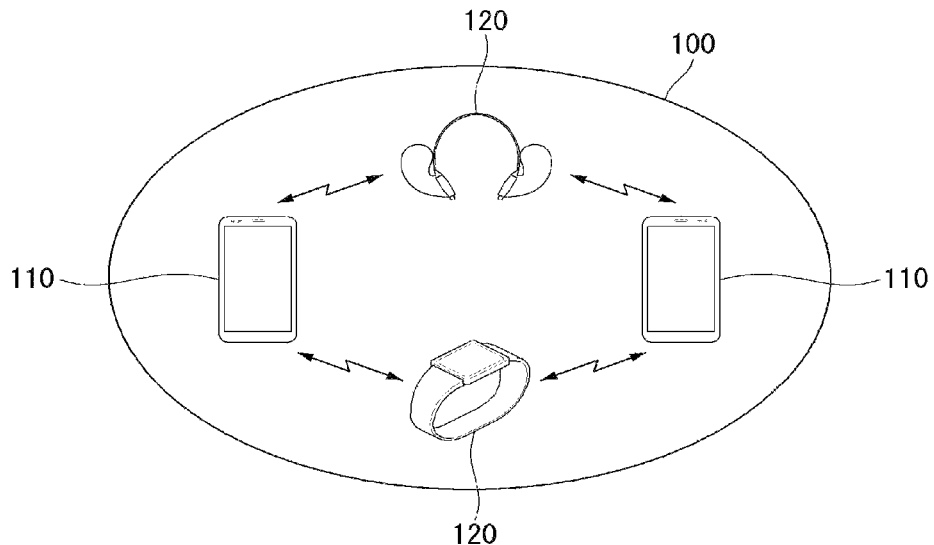
[FIG. 2]
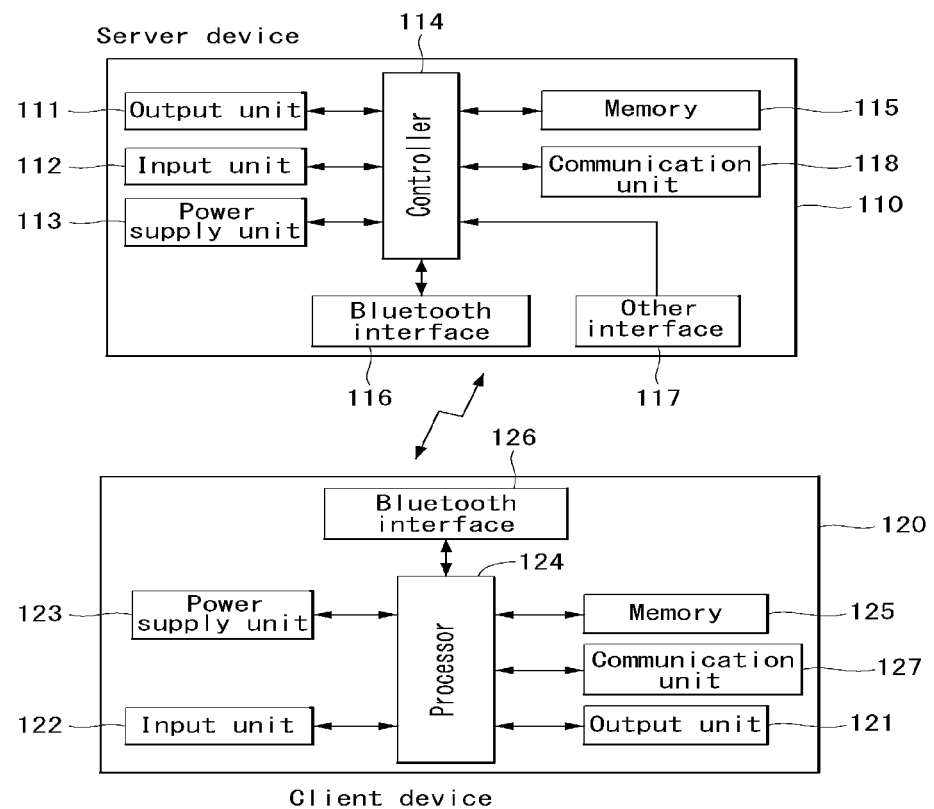

[FIG. 3]
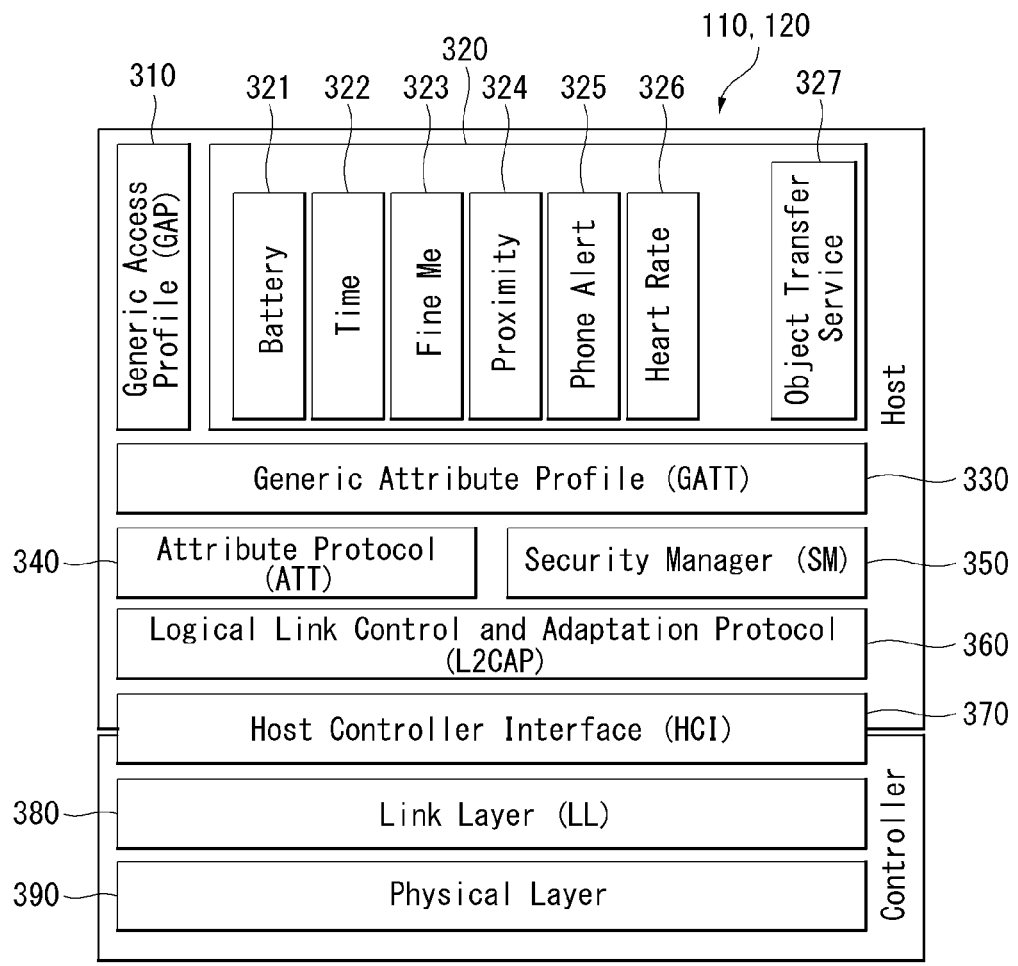

[FIG. 4]
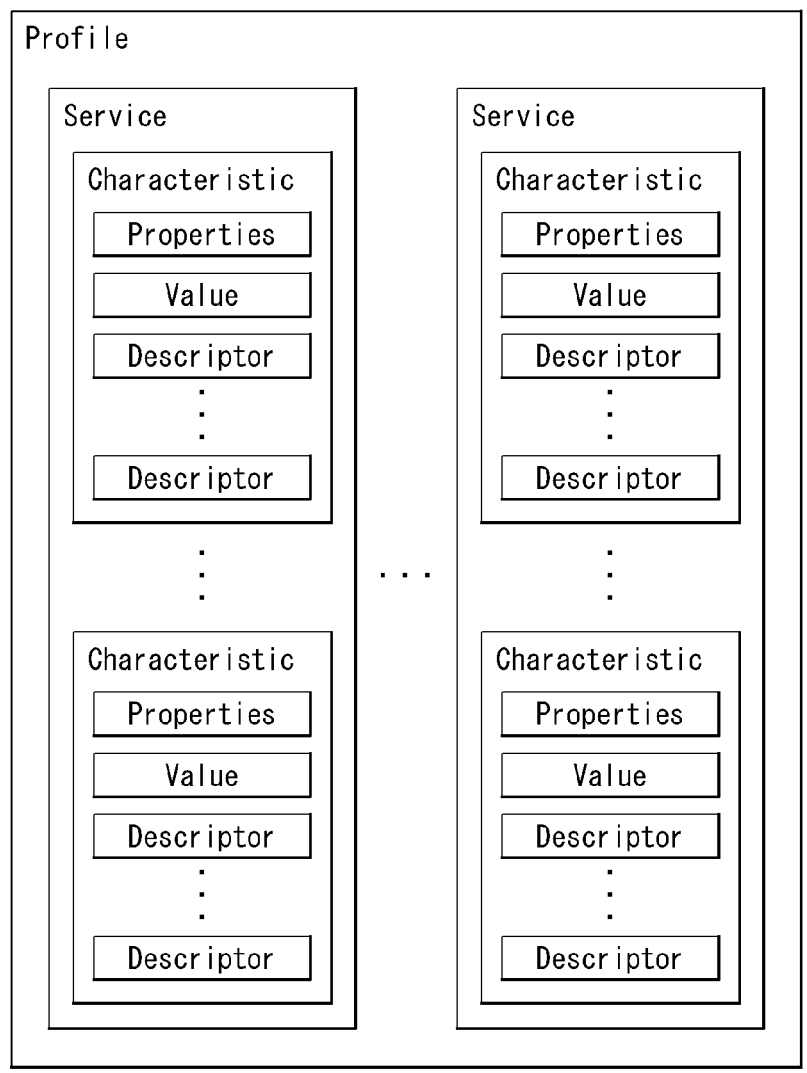

[FIG. 5]
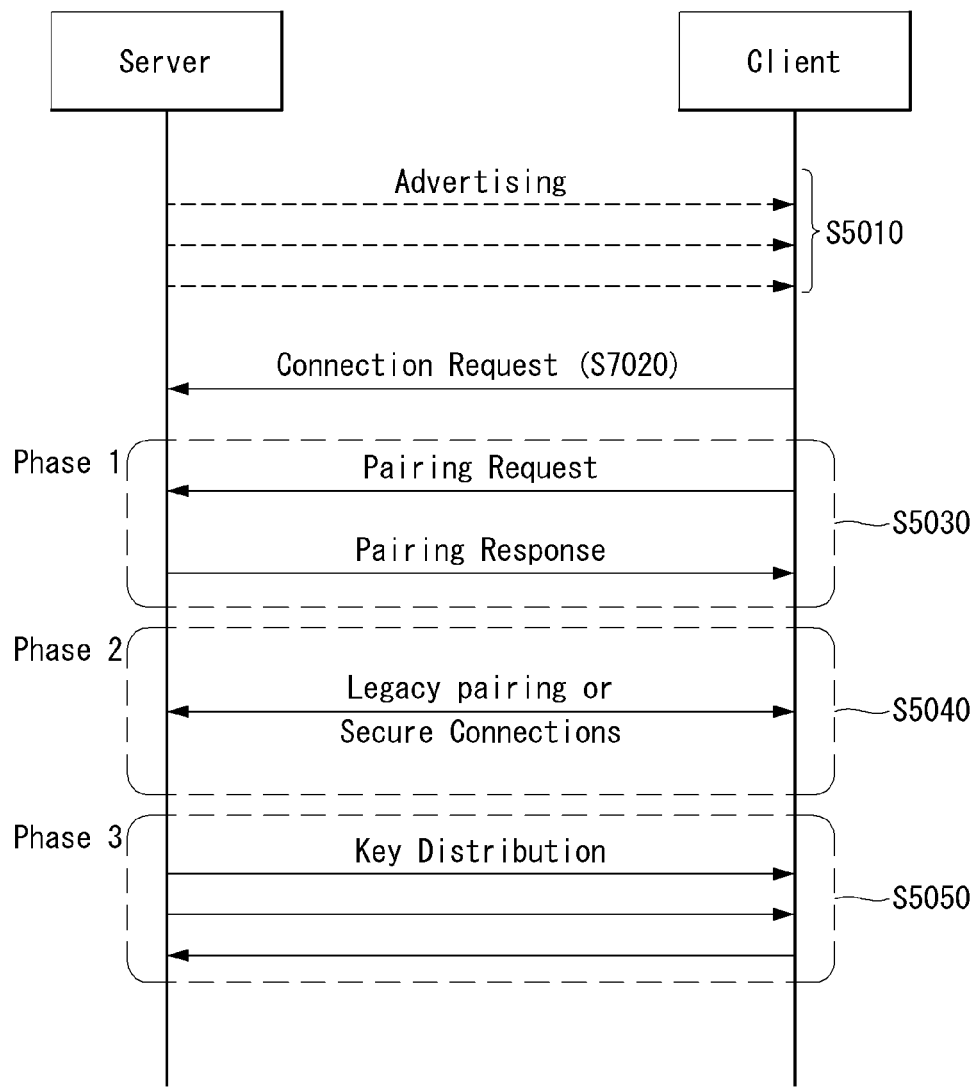

[FIG. 6]
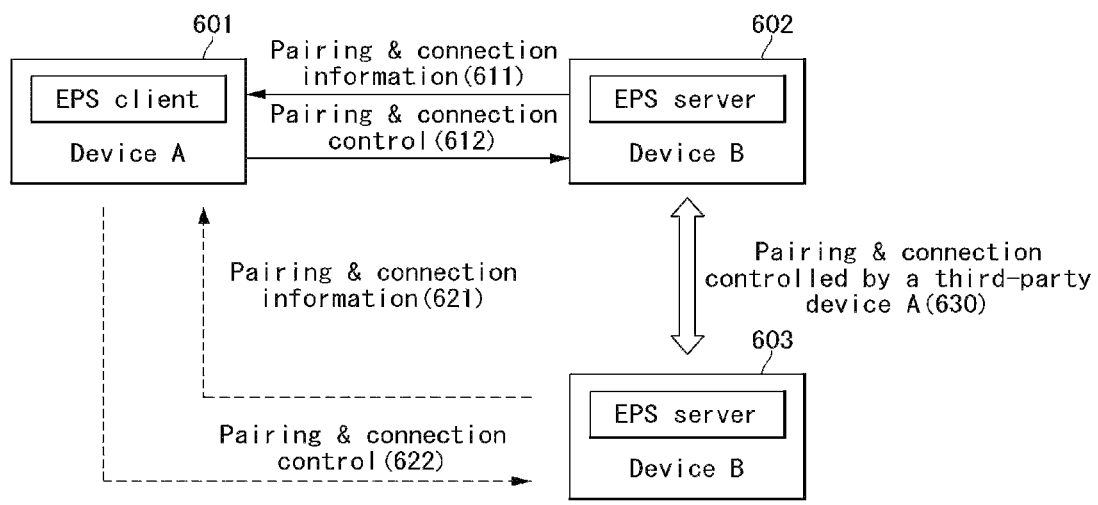

[FIG. 7]

| Field Name | Data Type(bits) | Size(Octets) | Unit | Byte Order |
|---|---|---|---|---|
| Operations | 16 | 2 | None | LSO ... MSO |
| Peer Device ID | 48 | 6 | None | LSO ... MSO |
| Expire Time | 16 | 2 | None | LSO ... MSO |
| Peer Device IRK | 128 | 16 | None | LSO ... MSO |

701

Parameter for LE Central Role Procedure

| Bit | Definition of Operations |
|---|---|
| 0 | Initiator Address:<br>The EPS server shall use its Resolvable Private Address if set to 1;<br>otherwise the EPS server shall use its Public or Static identity Address. |
| 1 | Bonding procedure:<br>The EPS server shall perform the Bonding procedure if set to 1;<br>otherwise the EPS server shall not perform the Bonding procedure. |
| 2 | Secure Connection mode:<br>The EPS server shall only establish an LE Secure Connection if set to 1;<br>otherwise the EPS server shall not establish an LE Secure Connection. |
| 3 | Connection establishment procedure:<br>The EPS server shall operate the auto connection establishment procedure if set to 1;<br>otherwise the EPS server shall operate the general connection establishment procedure. |
| 4 | Expore Time:<br>The Expire time field is persent if set to 1;<br>otherwise excluded. |
| 5 | Peer Device IRK:<br>The Peer Device IRK field is persent if set to 1;<br>otherwise excluded. |
| 6-15 | Reserved for Future Use. |

702

[FIG. 8]

[FIG. 9]
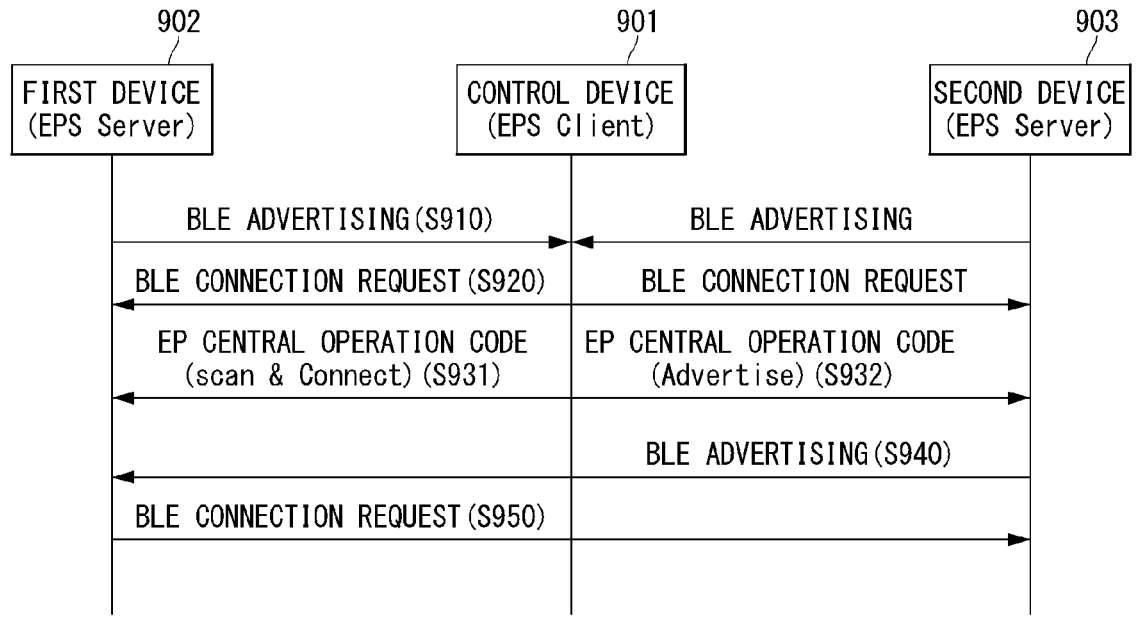
[FIG. 10]
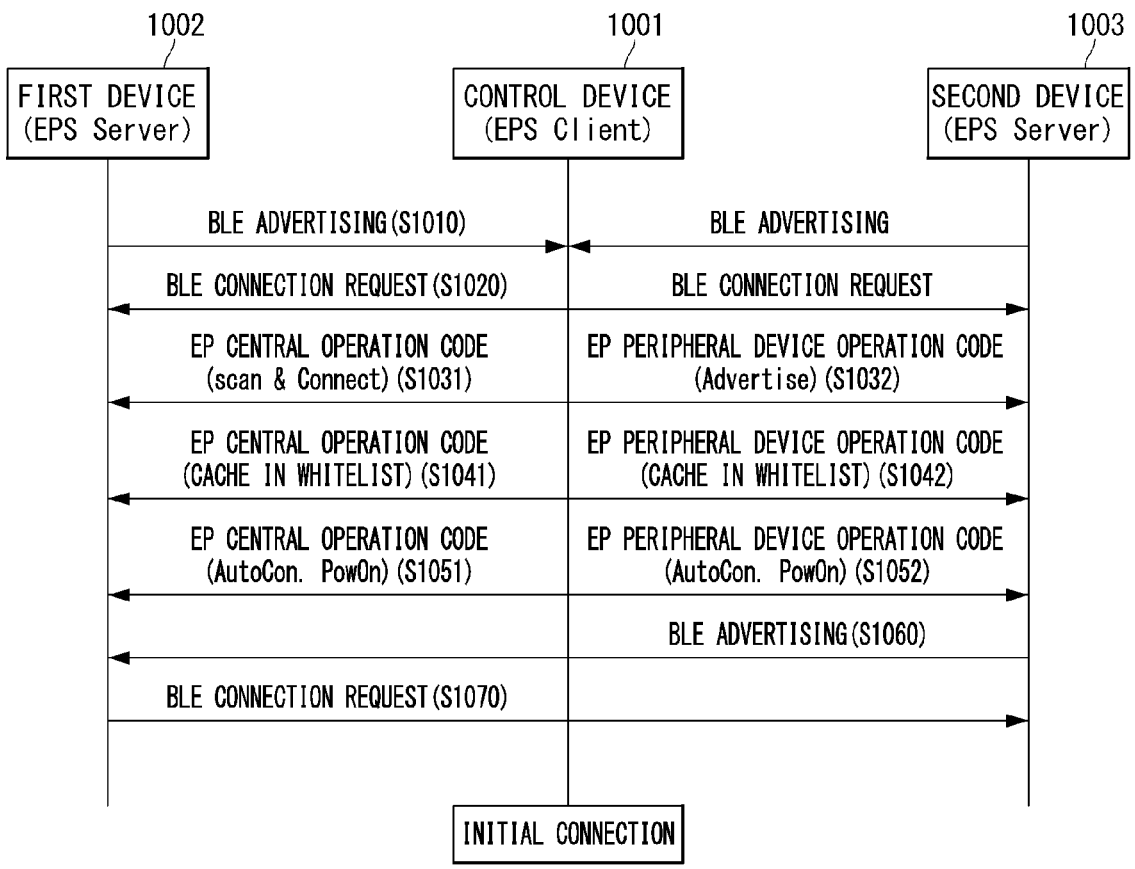

[FIG. 11]
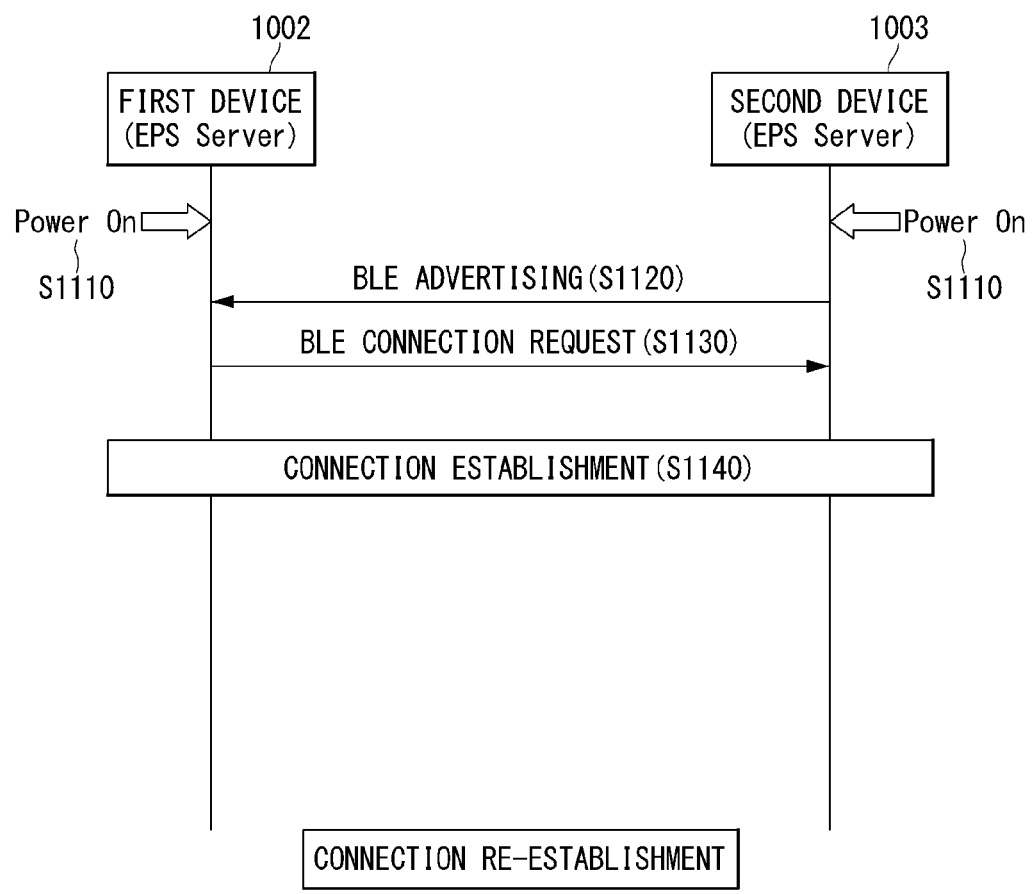

[FIG. 12]

| Bit | Definition of Operations |
|---|---|
| 0 | Initiator Address:<br>The EPS server shall use its Resolvable Private Address if set to 1;<br>otherwise the EPS server shall use its Public or Static Identity Address. |
| 1 | Bonding procedure:<br>The EPS server shall perform the Bonding procedure if set to 1;<br>otherwise the EPS server shall not perform the Bonding procedure. |
| 2 | Secure Connection mode:<br>The EPS server shall only establish an LE Secure Connection if set to 1;<br>otherwise the EPS server shall not establish an LE Secure Connection. |
| 3 | Connection establishment procedure:<br>The EPS server shall operate the auto connection establishment procedure if set to 1;<br>otherwise the EPS server shall operate the general connection establishment procedure. |
| 4 | Expire Time:<br>The Expire time field is present if set to 1;<br>otherwise excluded. |
| 5 | Peer Device IRK:<br>The Peer Device IRK field is present if set to 1;<br>otherwise excluded. |
| 6 | Save Peer Address to Whitelist<br>The EPS Server(Central) save Peer Device Address received from other EPS Server(Peripheral) if set to 1;<br>Otherwise do not save. |
| 7 | Auto Connect when Power On<br>After initial Easy Pairing setup finished and there's no Connection Manager next time. This device acts as Central.<br>When power on, the Central will receive advertising from peer in Whitelist and Connect request automatically If set to 1;<br>Otherwise do 0-3 procedure where CM exists |
| 7-15 | Reserved for Future Use. |

[FIG. 13]

| Bit | Definition of Operations |
|---|---|
| 0 | Advertiser Address:<br>The EPS server shall use its Resolvable Private Address if set to 1;<br>otherwise the EPS server shall use its Public or Static Identity Address. |
| 1 | Bondable mode:<br>The EPS server shall operate in bondable mode if set to 1;<br>otherwise the EPS server shall operate in non-bondable mode. |
| 2 | Secure Connection mode:<br>The EPS server shall only accept an LE Secure Connection if set to 1;<br>otherwise the EPS server shall not accept an LE Secure Connection. |
| 3 | Discoverable mode:<br>The EPS server shall operate in limited discoverable mode if set to 1;<br>otherwise the EPS server shall operate in general discoverable mode. |
| 4 | Connectable mode:<br>The EPS server shall operate in directed connectable mode if set to 1;<br>otherwise the EPS server shall operate in undirected connectable mode. |
| 5 | Peer Device ID:<br>The Peer Device ID field is present if set to 1;<br>otherwise excluded. |
| 6 | Expire Time:<br>The Expire time field is present if set to 1;<br>otherwise excluded. |
| 7 | Peer Device IRK:<br>The Peer Device IRK field is present if set to 1;<br>otherwise excluded. |
| 8 | Save Peer Address to Whitelist<br>The EPS Server(Peripheral) save Peer Device Address received from other EPS Server(Central) if set to 1;<br>Otherwise do not save. |
| 9 | Auto Connect when Power On<br>After initial Easy Pairing setup finished and there's no Connection Manager next time. This device acts as Peripheral.<br>When Power on, the Peripheral will advertise and when Connect request from peer(Central) is received,<br>automatically connect If set to 1;<br>Otherwise do 0~4 procedure where CM exists |
| 10-15 | Reserved for Future Use. |

[FIG. 14]
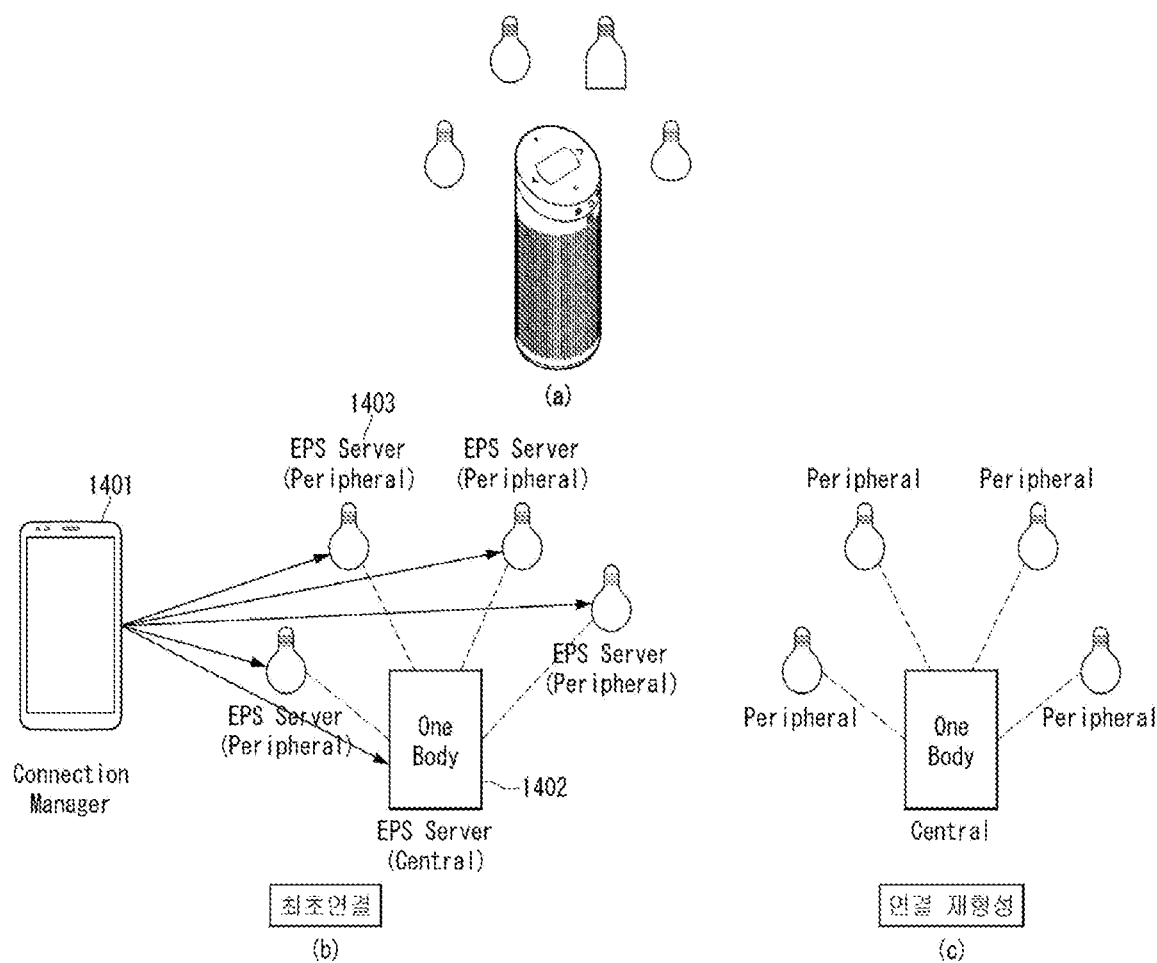

[FIG. 15]
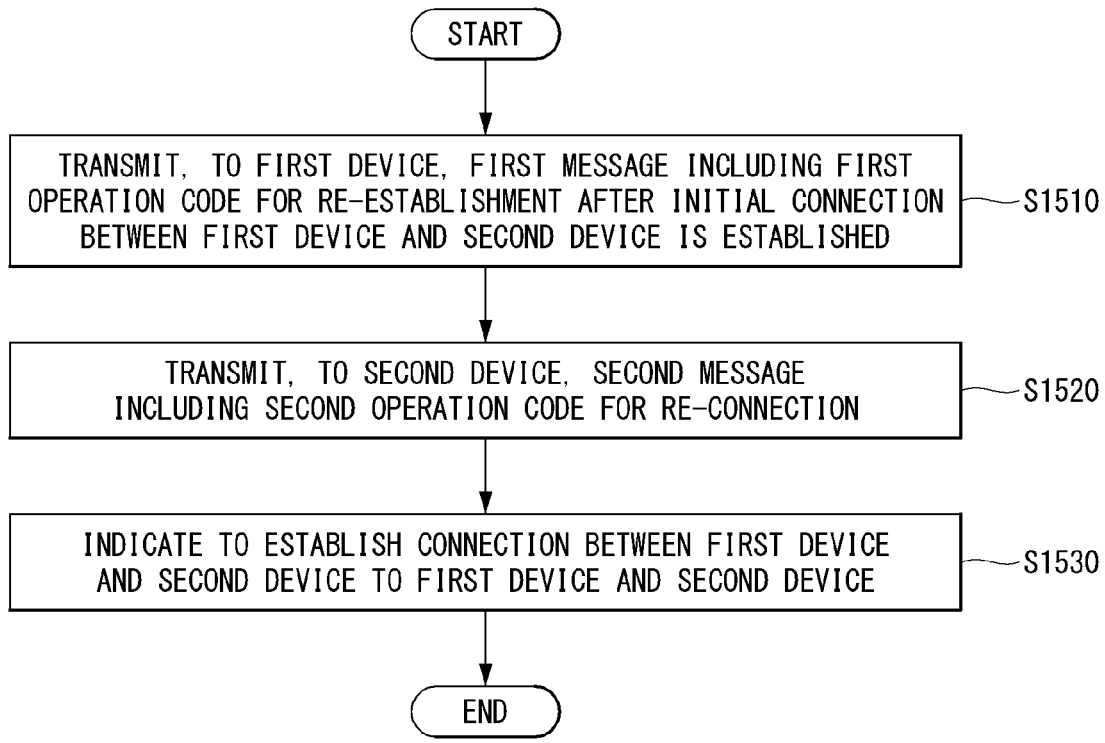
[FIG. 16]
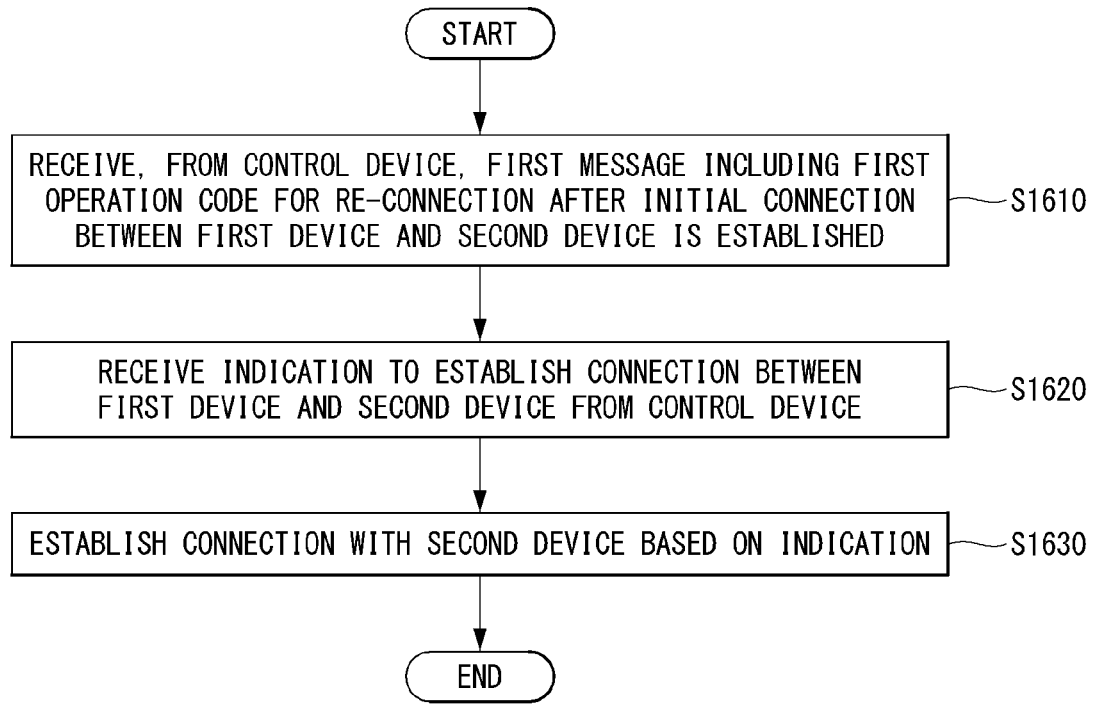

METHOD FOR CONTROLLING ESTABLISHMENT OF CONNECTION BETWEEN DEVICES BY USING SHORT-RANGE WIRELESS COMMUNICATION IN WIRELESS COMMUNICATION SYSTEM, AND APPARATUS THEREFOR

CROSS-REFERENCE TO RELATED APPLICATION

This application is the National Stage filing under 35 U.S.C. 371 of International Application No. PCT/KR2020/002557, filed on Feb. 21, 2020, which claims the benefit of KR Application No. 10-2019-0020759, filed on Feb. 21, 2019, the contents of which are all hereby incorporated by reference herein in their entirety.

TECHNICAL FIELD

The present disclosure relates to a wireless communication system, and particularly, to a method for controlling establishment of a connection between devices by using short-range wireless communication, and an apparatus therefor.

BACKGROUND ART

Bluetooth is a near field communication (NFC) technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perestablish a connection.

Bluetooth communication methods include a basic rate/enhanced data rate (BR/EDR) method and a low energy (LE) method which is a low power method. The BR/EDR method may be referred to as Bluetooth Classic. The Bluetooth classic method includes a Bluetooth technology that has been continued from Bluetooth 1.0 using a basic rate and a Bluetooth technology using an enhanced data rate supported since Bluetooth 2.0.

The Bluetooth low energy (BLE) technology has been applied since Bluetooth 4.0 and may stably provide information of hundreds of kilobytes (KB) by consuming low energy. The BLE technology exchanges information between devices by utilizing an attribute protocol. This BLE method may reduce energy consumption by reducing overhead of a header and simplifying an operation.

Some Bluetooth devices do not have a display or a user interface. Complexity of connection/management/control/disconnection between various kinds of Bluetooth devices and Bluetooth devices employing similar technologies has increased.

Further, although Bluetooth may achieve a relatively high speed at a relatively low power and low cost, a transmission distance is generally limited to a maximum of 100 m, and thus, Bluetooth is suitable for use in a limited space.

DISCLOSURE

Technical Problem

The present disclosure has been made in an effort to provide a method for controlling establishment of a connection between devices by using short-range wireless communication in a wireless communication system, and an apparatus therefor.

Further, the present disclosure has been made in an effort to provide a method for controlling establishment of a connection between devices without a control device in a short-range wireless communication system, and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method for controlling establishment of connection between devices using short-range wireless communication and an apparatus therefor.

More specifically, in the present disclosure, a method for a control device to control a connection between a first device and a second device using short-range wireless communication, the method comprising: transmitting, to the first device, a first message including a first operation code for reconnection after an initial connection between the first device and the second device is established, wherein the first operation code includes a first code instructing storage of an address of the second device in a first white list including addresses of devices connected to the first device at least once; transmitting, to the second device, a second message including a second operation code for the reconnection, wherein the second operation code includes a second code instructing storage of an address of the first device in a second white list including addresses of devices connected to the second device at least once; and instructing the first device and the second device to form a connection between the first device and the second device, wherein each of the first white list and the second white list includes addresses of devices connected without the control device when a connection is released after the initial connection.

Furthermore, in the present disclosure, wherein the first operation code includes a third code instructing to perform the reconnection when a power of the first device is turned on, wherein the second operation code further includes a fourth code instructing to perform the reconnection when a power of the second device is turned on.

Furthermore, in the present disclosure, wherein based on bit values of the first code and the second code are 1, the first code and the second code instruct a device to store an address of a counterpart device in a white list, wherein based on that bits of the first code and the second code are 0, the first code and the second code instruct a device not to store an address of a counterpart device in a white list.

Furthermore, in the present disclosure, transmitting, to the first device, a third message including a third operation code instructing a role of the first device for establishing the connection; and transmitting, to the second device, a fourth message including a fourth operation code instructing a role of the second device for establishing the connection.

Furthermore, in the present disclosure, wherein based on that the role of the first device is a central device and based on that a bit value of the third code is 1, the third code instructs the first device to request a connection to the second device based on that the first device receives an advertisement message for establishing the connection between the first device and the second device from the second device after the power of the first device is changed from the OFF state to the ON stat, and wherein based on that the role of the first device is the central device and based on that the bit value of the third code is 0, the third code instructs the first device to perform a connection establishment procedure with the second device under a control of the control device after the power of the first device is changed from the OFF state to the ON state.

Furthermore, in the present disclosure, wherein based on that the role of the second device is a peripheral device and based on that a bit value of the fourth code is 1, the fourth code instructs the second device to (i) broadcast an advertisement message for a connection establishment between the first device and the second device and (ii) establish the connection with the first device when receiving a connection request from the first device, after the power of the second device is changed from an OFF state to an ON state, and wherein based on that the role of the second device is a peripheral device and based on that a bit value of the fourth code is 0, the fourth code instructs the second device to perform a connection establishment procedure with the first device under a control of the control device, after the power of the second device is changed from the OFF state to the ON state.

Furthermore, in the present disclosure, further comprising: receiving, from the first device, a first advertisement message to determine the role of the first device; receiving, from the second device, a second advertisement message to determine the role of the second device; and determining the role of the first device and the role of the second device based on the first advertisement message and the second advertisement message, wherein the first advertisement message includes capability information of the first device, and wherein the second advertisement message includes capability information of the second device.

Furthermore, in the present disclosure, a method for a control device to control a connection between a first device and a second device using short-range wireless communication, the method performed by the first device comprising: receiving, from the control device, a first message including a first operation code for reconnection after an initial connection between the first device and the second device is established, wherein the first operation code includes a first code instructing storage of an address of the second device in a first white list including addresses of devices connected to the first device at least once; receiving, from the control device, an instruction to establish a connection between the first device and the second device; and establishing the connection with the second device based on the instruction, wherein the first white list includes addresses of devices connected without the control device when the connection is released after the initial connection.

Furthermore, in the present disclosure, a control device for controlling the connection between the first device and the second device using short-range wireless communication, the control device comprising: a transmitter for transmitting a radio signal; a receiver for receiving the radio signal; and a processor operatively connected to the transmitter and the receiver, wherein the processor is configured to control: the transmitter to transmit, to the first device, a first message including a first operation code for reconnection after an initial connection between the first device and the second device is established, wherein the first operation code includes a first code instructing storage of an address of the second device in a first white list including addresses of devices connected to the first device at least once; the transmitter to transmit, to the second device, a second message including a second operation code for the reconnection, wherein the second operation code includes a second code instructing storage of an address of the first device in a second white list including addresses of devices connected to the second device at least once; and instruct the first device and the second device to form a connection between the first device and the second device, wherein each of the first white list and the second white list includes addresses of devices connected without the control device when a connection is released after the initial connection.

Furthermore, in the present disclosure, a first device being controlled on a connection between the first device and a second device using short-range wireless communication, the first device comprising: a transmitter for transmitting a radio signal; a receiver for receiving the radio signal; and a processor operatively connected to the transmitter and the receiver, wherein the processor is configured to control: the receiver to receive, from the control device, a first message including a first operation code for reconnection after an initial connection between the first device and the second device is established, wherein the first operation code includes a first code instructing storage of an address of the second device in a first white list including addresses of devices connected to the first device at least once; the receiver to receive, from the control device, an instruction to establish a connection between the first device and the second device; and establish the connection with the second device based on the instruction, wherein the first white list includes addresses of devices connected without the control device when the connection is released after the initial connection.

Advantageous Effects

According to the present disclosure, there is an effect that it is possible to control establishment of a connection between devices by using short-range wireless communication in a wireless communication system.

Further, according to the present disclosure, there is an effect that it is possible to establish a connection between devices without a control device by using short-range wireless communication in a wireless communication system.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 1 is a schematic diagram illustrating an example of a wireless communication system using the Bluetooth Low Power Energy technology proposed in the present disclosure.

FIG. 2 illustrates an example of an internal block diagram of a device which is available to implement the methods proposed in the present disclosure.

FIG. 3 is a diagram illustrating an example of a Bluetooth communication architecture to which the methods proposed in the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 is a diagram illustrating an example of an operation of controlling establishment of a connection between two devices by a control device.

FIG. 7 is a diagram illustrating an example of a parameter used in an LE central control procedure.

FIG. 8 is a diagram illustrating an example of a parameter used in an LE peripheral device control procedure.

FIG. 9 is a flowchart showing an example of an operation of controlling establishment of a connection between two devices by a control device.

FIGS. 10 and 11 are flowcharts showing an example in which a method proposed in the present disclosure is performed.

FIG. 12 illustrates another example of an LE central control procedure parameter.

FIG. 13 is a diagram illustrating another example of an LE peripheral device control procedure parameter.

FIG. 14 is a diagram illustrating an example of a method for controlling establishment of a connection between devices by a control device proposed in the present disclosure.

FIG. 15 is a flowchart showing an example of a control device operation of performing a method for controlling a connection between a first device and a second device by a control device proposed in the present disclosure.

FIG. 16 is a flowchart showing an example of a first device operation of performing a method for being controlled with a connection between a first device and a second device proposed in the present disclosure.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the present disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present disclosure, a term such as "comprising" or "including" should not be interpreted as necessarily including all various components or various steps disclosed in the present disclosure, and it should be interpreted that some component or some steps among them may not be included or additional components or steps may be further included. Suffixes "unit", "module", and "section" for components used in the following description are given or mixed in consideration of easy preparation of the present disclosure only and do not have their own distinguished meanings or roles. The terms "first," "second,", and the like are used to differentiate a certain component from other components, but the scope should not be construed to be limited by the terms.

FIG. 1 is a schematic diagram illustrating an example of a wireless communication system using Bluetooth low energy (BLE) technology to which the present disclosure may be applied.

A wireless communication system 100 includes at least one server device 120 and at least one client device 110.

The server device and the client device perform Bluetooth communication using a BLE technology.

First, BLE technology has a relatively small duty cycle, may be produced at low cost, and significantly reduces power consumption through a low data rate, and thus, it is possible to operate for more than a year in the case of using a coin cell battery, compared to Bluetooth basic rate/enhanced data rate (BR/EDR) technology.

In addition, the BLE technology simplifies a connection process between devices, and a packet size is smaller than that of the Bluetooth BR/EDR technology.

In BLE technology, (1) the number of RF channels is 40, (2) 1 Mbps is supported as a data rate, (3) topology is a scatternet structure, (4) latency is 3 ms, and (5) a maximum current is 15 mA or less, (6) output power is 10 mW (10 dBm) or less, and (7) the BLE technology is mainly used in applications such as mobile phones, watches, sports, healthcare, sensors, device control, and the like.

The server device 120 may operate as a client device in a relationship with other devices, and the client device may operate as a server device in a relationship with other devices. That is, in the BLE communication system, any one device may operate as a server device or a client device, and may operate as both a server device and a client device, if necessary.

The server device 120 may be represented as a data service device, a slave device, a slave, a server, a conductor, a host device, a gateway, a sensing device, a monitoring device, a first device, a second device and the like.

the client device 110 may be represented as a master device, a master, a client, a member, a sensor device, a sink device, a collector, a third device, a fourth device, and the like.

The server device and the client device correspond to main components of the wireless communication system, and the wireless communication system may include other components in addition to the server device and the client device.

The server device refers to a device which is provided with data from the client device, directly communicates with the client device, and provides data to the client device through a response when a data request is received from the client.

In addition, the server device sends a notification message and an indication message to the client device to provide data information to the client device. In addition, when the server device transmits the indication message to the client device, the server device receives a confirmation message corresponding to the indication message from the client.

In addition, in the process of transmitting and receiving the notification message, the indication message, and the confirmation message to and from the client device, the server device may provide data information to a user through a display unit or may receive a request input from a user through a user input interface.

In addition, the server device may read data from a memory unit or write new data to the corresponding memory in the process of transmitting and receiving a message to and from the client device.

In addition, one server device may be connected to a plurality of client devices and may be easily reconnected (or connected) with client devices by using bonding information.

The client device 120 refers to a device that requests data information and data transmission from the server device.

The client device receives data from the server device through the notification message, the indication message, and the like, and when the indication message is received from the server device, the client device sends a confirmation message in response to the indication message.

Similarly, the client device may provide information to the user through an output unit or receive an input from the user through the input unit in the process of transmitting and receiving a message to and from the server device.

In addition, the client device may read data from a memory or write new data into the corresponding memory in the process of transmitting and receiving a message to and from the server device.

Hardware components such as the output unit, the input unit, and the memory of the server device and the client device will be described in detail with reference to FIG. 2.

In addition, the wireless communication system may configure personal area networking (PAN) through Bluetooth technology. For example, in the wireless communication system, files, documents, and the like may be exchanged quickly and safely by establishing a private piconet between devices.

FIG. 2 illustrates an example of an internal block diagram of a device which is available to implement the methods proposed in the present disclosure.

As shown in FIG. 2, a server device 110 includes a display unit 111, a user input interface 112, a power supply unit 113, a processor 114, a memory unit 115, a Bluetooth interface 116, other interfaces 117 and a communication unit (or transceiver) 118.

The display unit 111, the user input interface 112, the power supply unit 113, the processor 114, the memory unit 115, the Bluetooth interface 116, the other interface 117 and the communication unit 118 are functionally connected to perform the method proposed in the present disclosure.

In addition, a client device 120 includes a display unit 121, a user input interface 122, a power supply unit 123, a processor 124, a memory unit 125, a Bluetooth interface 126 and a communication unit (or transceiver) 127.

The display unit 121, the user input interface 122, the power supply unit 123, the processor 124, the memory unit 125, the Bluetooth interface 126 and the communication unit 127 are functionally connected to perform the method proposed in the present disclosure.

The Bluetooth interface 116 or 126 is referred to as a unit (or module) which is available to transmit a request/response, a command, an alarm, an indication/acknowledge message or a data between devices by using the Bluetooth technology.

The memory 115 or 125 is a unit implemented in various types of devices and referred to as a unit in which various types of data are stored.

The processor 114 or 124 is referred to a module for controlling overall operations of the server device 110 or the client device 120 and controls to process a transmission request of a message through the Bluetooth interface or other communication interface and process a received message.

The processor 114 or 124 may be represented as a control part, a control unit, a controller, and the like.

The processor 114 or 124 may include an application-specific integrated circuit (ASIC), other chipset, a logical circuit and/or a data processing device.

The processor 114 or 124 controls the communication unit to receive an Advertising message from the server device 110, controls the communication unit to transmit a Scan Request message to the server device 110 and receive a Scan Response message from the server device 110 in response to the Scan Request, and controls the communication unit to transmit a Connection Request message to the server device 110 for a Bluetooth connection configuration with the server device.

In addition, the processor 114 or 124 controls the communication unit to read or write data using an attribute protocol from the server device 110 after a Bluetooth LE connection is established through the connection procedure.

The memory 115 or 125 may include read-only memory (ROM), random access memory (RAM), flash memory, a memory card, a storage medium and/or other storage device.

The communication unit 118 or 127 may include a baseband circuit for processing a wireless signal. When an embodiment is implemented in software, the technique may be implemented as a module (process, function, etc.) for performing the function described above. The module may be stored in the memory and executed by the processor.

The memory 115 or 125 may be interior or exterior of the processor 114 or 124 and may be connected to the processor 114 or 124 with a well-known means.

The display unit 111 or 121 is referred to as a module for providing state information or message exchange information of a device to a user using a screen.

The power supply unit (power source supply unit) 113 or 123 is referred to a module for receiving an external power source or an internal power source under a control of a controller and supplying a power required for an operation of each of the elements.

As described above, the BLE technology has a small duty cycle and may reduce a power consumption significantly with a low-speed data transmission rate.

FIG. 3 is a diagram illustrating an example of a Bluetooth communication architecture to which the methods proposed in the present disclosure may be applied.

Particularly, FIG. 3 shows an example of the architecture of Bluetooth Low Energy (LE).

As shown in FIG. 3, the BLE architecture includes a Controller stack operable to process a wireless device interface of which timing is important and a Host stack operable to process a high level data.

The Controller stack may also be referred to as a Controller but referred to as the Controller stack below in order to avoid a confusion with the processor which is an internal element of the device mentioned with reference to FIG. 2 above.

First, the Controller stack may be implemented by using a communication module that may include a Bluetooth wireless device and a processor module that may include a processing device such as a microprocessor, for example.

The Host stack is a part of the OS operated on a processor module or may be implemented as an instantiation of a package on the OS.

In a part of instances, the Controller stack and the Host stack may be operated or executed on the same processing device in the processor module.

The Host stack includes GAP (Generic Access Profile) 310, GATT based Profiles 320, GATT (Generic Attribute Profile) 330, ATT (Attribute Protocol) 340, SM (Security Manage) 350 and L2CAP (Logical Link Control and Adaptation Protocol) 360. However, the Host stack is not limited thereto, but may include various protocols and profiles.

The host stack may multiplex various protocols, profiles, and the like provided in the higher Bluetooth layer by using the L2CAP.

First, the logic link control and adaptation protocol (L2CAP) 360 may provide one bidirectional channel for transmitting the data to a specific protocol or profile.

The L2CAP is operable to multiplex the data among higher layer protocols, segment and reassemble packages, and manage multicast data transmission.

In the BLE, three fixed channels (one for a signaling CH, one for the security manager, and one for the attribute protocol) are used.

On the contrary, in basic rate/enhanced data rate (BR/EDR), the dynamic channel is used and the protocol service multiplexer, the retransmission, the streaming mode, and the like are supported.

The security manager (SM) 350 is a protocol for authenticating the device and providing key distribution.

The attribute protocol (ATT) 340 defines a rule for accessing data of a counter device in a server-client structure. The ATT includes six following message types (request, response, command, notification, indication, and confirmation).

That is, (1) Request and Response message: a request message refers to the message used by a client device to request specific information to a server device, and a response message refers to the message transmitted by the server device to the server device in response to the request message.

(2) Command message: a message transmitted from a client device to a server device to command a specific operation. The server device does not transmit a response to the command message to the client device.

(3) Notification message: It is a message transmitted from the server device to the client device in order to notify an event, or the like. The client device does not transmit a confirmation message with respect to the notification message to the server device.

(4) Indication and confirmation message: It is a message transmitted from the server device to the client device in order to notify an event, or the like. Unlike the notification message, the client device transmits a confirmation message regarding the indication message to the server device.

The generic access profile (GAP) 45 as a layer newly implemented for the BLE technology is used for selecting a role for communication among BLE devices and control how multi profiles are actuated.

Further, the GAP is primarily used in device discovery, connection creation, and security procedure parts and defines a scheme for providing the information to the user and defines the type of the attribute.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

GATT-based Profiles are profiles having a dependency on the GATT and is used mainly for BLE devices. GATT-based Profiles includes Battery, Time, FindMe, Proximity, Time, Object Delivery Service and the like; specific contents of the GATT-based profiles are as follows.

Battery: Battery information exchanging method

Time: Time information exchanging method

FindMe: Provision of alarm service according to distance

Proximity: Battery information exchanging method

Time: Time information exchanging method

GATT is operable as a protocol for describing how the ATT is used at the time of setting the services. For example, the GATT is operable to regulate how ATT attributes are together grouped by the services and operable to describe features associated with the services.

Therefore, the GATT and the ATT may use the features in order to describe the status of the device and the services and describe how the features are associated with each other and how the features are used.

The Controller stack includes a Physical Layer 390, a Link Layer 380 and a Host Controller Interface 370.

The Physical Layer (wireless transceiver module) 390 is a layer of transmitting and receiving a wireless signal of 2.4 GHz and uses GFSK (Gaussian Frequency Shift Keying) modulation and a frequency hopping technique configured with 40 RF channels.

The Link Layer 380 transmits or receives a Bluetooth packet.

In addition, the Link Layer 380 provides functions of generating a connection between devices after performing Advertising and Scanning functions using three Advertising channels and exchanging a data packet of maximum 42 bytes through 37 channels.

The HCl (Host Controller Interface) provides an interface between the Host stack and the Controller stack so as to provide a command and a data from the Host stack to the Controller stack and provide an event and a data from the Controller stack to the Host stack.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of data from advertising devices using an advertising physical channel.

The scanning device transmits a scan request to an advertising device through an advertising physical channel in order to request additional data from the advertising device. The advertising device transmits a scan response as a response with respect to the scan request, by including additional data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device perestablishing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 4 is a diagram illustrating an example of a structure of a GATT of BLE.

A structure for exchanging profile data of BLE will be described with reference to FIG. 4.

Specifically, the GATT defines a method of exchanging data using services and characteristics between Bluetooth LE devices.

In general, a peripheral device (e.g., a sensor device) acts as a GATT server and has definitions of services and characteristics, and a central device acts as GATT client.

A GATT client send a data request to the GATT server to read or write data, and all transactions begin at the GATT client and a response is from the GATT server.

The GATT-based operation structure used in the Bluetooth LE is based on a profile, a service, and a characteristic and may have a vertical structure as shown in FIG. 4.

The profile includes one or more services, the one or more services may include one or more characteristics or other services.

The service serves to divide data into logical units and may include one or more characteristics or other services. Each service has a 16-bit or 128-bit identifier called a universal unique identifier (UUID).

The characteristic is the lowest level unit in the GATT-based operation structure. The characteristic includes only one data and has a 16-bit or 128-bit UUID similar to the service.

The characteristic is defined as a value of various pieces of information and requires one attribute to include each information. The characteristic may use various continuous attributes.

The attribute includes four components and has the following meaning.

handle: address of attribute
Type: Type of attribute
Value: Value of attribute
Permission: authority to access attribute FIG. 5 is a flowchart illustrating an example of a connection procedure method in the Bluetooth Low Power Energy technique to which the methods proposed in the present disclosure may be applied.

A server transmits an Advertising message to a client through three Advertising channels (step, S5010).

Before a connection, the server may be called an Advertiser and, after a connection, the server may be called a Master. An example of the server is a sensor (temperature sensor, etc.).

In addition, the client may be called a Scanner before a connection and may be called a Slave after a connection. An example of the client is a smart phone.

As described above, Bluetooth performs a communication by dividing into total 40 channels through 2.4 GHz band. Three channels among the 40 channels are used for an exchange of packets such as various Advertising Packets transmitted and received to establish a connection.

The remaining 37 channels are used for an exchange of data after a connection to a data channel.

The client may receive the Advertising message, and then, transmit a Scan Request message to the server to obtain an additional data (e.g., server device name, etc.).

In this case, the server transmits a Scan Response message including an additional data in response to the Scan Request message.

Here, the Scan Request message and the Scan Response message may be types of an Advertising packet, and the Advertising packet may include only a User Data of 31 byte or smaller.

Accordingly, in the case that there is a data of which size is greater than 3 bytes but of which overhead is great to send a data by establishing a connection, the data is sent in a dividing manner through two times using the Scan Request message/the Scan Response message.

Next, the client transmits a Connection Request message for a Bluetooth connection configuration with the server to the server (step, S5020).

Through this, a Link Layer (LL) connection is established between the server and the client.

Thereafter, the server and the client perform a security establishment procedure.

The security establishment procedure may be interpreted as a Secure Simple Pairing or may be performed with the Secure Simple Pairing.

That is, the security establishment procedure may be performed throughout Phase 1 step to Phase 3 step.

Particularly, a pairing procedure (Phase 1) is performed between the server and the client (step, S5030).

In the pairing procedure, the client transmits a Pairing Request message to the server, and the server transmits a Pairing Response message to the client.

Through the pairing procedure, authentication requirements, I(Input)/O(Output) capabilities, and Key Size are exchanged between devices. Through the information, a type of Key generation method to be used is determined in Phase 2.

Next, in Phase 2, a legacy pairing or a security connection is performed between the server and the client (step, S5040).

In Phase 2, a Temporary Key and a Short Term Key (STK) are generated, which are 128 bits to perform a legacy pairing.

Temporary Key: A key made to generate STK
Short Term Key (STK): A key value used to make an Encrypted connection between devices In the case that the security connection is performed in Phase 2, a Long Term Key (LTK) of 128 bits is generated.

Long Term Key (LTK): A key value used not only in an Encrypted connection between devices but also in a later connection Thereafter, in SSP Phase 3, a Key Distribution procedure is performed between the server and the client (step, S5050).

Through this, the security connection is established between the server and the client, and the Encrypted link is established, and accordingly, a data may be transmitted and received.

A procedure establishing a connection between two devices by using Bluetooth Low Energy technology is as follows. The two devices may be devices with a user interface (UI).

A peripheral device (hereinafter, referred to as a peripheral device) which is one device of two devices informs a central device (hereinafter, referred to as a central device) which is the other one device of an address thereof through an advertising message.

Next, the central device scans a data packet included in the advertising message and obtains an address included in the advertising message.

Last, the central device requests a connection to the peripheral device based on the obtained address and the connection between two devices is established.

In this case, after the connection between two devices is established, whether an address of each of two devices used for the connection establishment is to be cached in a Whitelist of each device may be determined according to a selection of a host of each device.

More specifically, when each address of the other device is cached in the Whitelist of each device, the connection between two devices is released, and then when the connection is re-established, the cached address may be used.

On the contrary, when each address of the other device is not cached in the Whitelist of each device, the connection between two devices is released, and then whenever the connection is re-established, a procedure for re-establishing the connection between two devices should be repeated.

Unlike the procedure for establishing the connection between two devices, there may be no UI in two devices of which connection is to be established. In this case, in order to establish the connection between two devices, a third device which serves as a control device should be able to control the two devices. Hereinafter, the third device may be called a connection manager.

Technology in which the third device serving as the control device controls the connection between two devices without the UI may be called easy pairing. Hereinafter, the third device may be called the control device.

When an initial connection between two devices without the UI is established through the easy pairing technology, the initial connection may be released according to a specific situation. In this case, when the connection between two devices, which is released is re-established, there may be no control device for controlling the establishment of the connection of the two devices. In such a case, when the address of the other device of which initial connection is established is not cached in the Whitelist of each of the two devices, there is a problem in that the two devices may not re-establish the released connection without controlling the control device.

The present disclosure provides a method for controlling establishment of a connection between devices by a control device, and a method for an apparatus therefor, in order to solve such a problem. More specifically, the present disclosure relates to a method in which a device of which initial connection is established by a control device may re-establish a released connection without controlling the control device when the initial connection is released, and an apparatus therefor.

Hereinafter, for convenience of description, other devices controlled by the control device may be expressed as a first device, a second device, etc.

FIG. 6 is a diagram illustrating an example of an operation of controlling establishment of a connection between two devices by a control device.

An easy pairing service (EPS) client device (central) 601 which is the connection manager receives an advertising message from two devices (peripheral) 602 and 603 which serve as an EPS server device (611 and 621). The advertising message may include pairing and connection information. The EPS client device may a control device that controls the connection between the two devices.

The EPS client device 601 may request the connection to the two devices, and form the connection of each of the two devices (612 and 622). In this case, the connection requests to the two devices of the EPS client device may be simultaneously performed.

The EPS client device determines, as the central device, a device which is more excellent in performance and smoother in power supply than the remaining one device among the two devices. The EPS client device may determine a device which is to operate as the central device among the two devices based on an advertising message received from an EPS server device. More specifically, the advertising message may include capability information of the EPS server device, etc., and the EPS client device may determine the central device based on the capability information included in the advertising message, etc. Thereafter, the EPS client device performs an LE central control procedure with the central device. The LE central control procedure may mean a procedure in which the ESP client device indicates instructions for a connection establishment to a device serving as the central device in a subsequent connection establishment procedure among the EPS server devices.

The EPS client device determines, as the peripheral device, a device which is less excellent in performance and less smooth in power supply than the remaining one device among the two devices. The EPS client device may determine a device which is to operate as the peripheral device among the two devices based on the advertising message received from the EPS server device. More specifically, the advertising message may include the capability information of the EPS server device, etc., and the EPS client device may determine the peripheral device based on the capability information included in the advertising message, etc. Thereafter, the EPS client device performs an LE peripheral control procedure with the peripheral device. The LE peripheral device control procedure may mean a procedure in which the ESP client device indicates instructions for a connection establishment to a device serving as the peripheral device in a subsequent connection establishment procedure among the EPS server devices.

The EPS server device that performs the LE central control procedure serves as the central device in a procedure of establishing the connection with another device. Further, the EPS server device that performs the LE peripheral device control procedure serves as the peripheral device in a procedure of establishing the connection with another device.

The EPS client device controls the two EPS server devices, and as a result, two EPS server devices establish the connection based on a role determined by the EPS client device.

The LE central control procedure described in FIG. 6 may be supported when the EPS server device supports a central role. That is, when the EPS server device performs the central role in the connection procedure with another EPS server device, the EPS client device may perform the central control procedure with the EPS server device.

The LE central control procedure may include a parameter for controlling an operation of the EPS server device. The parameter may be constituted by four fields. In particular, an operation field defines an operation requested to be performed by the EPS server device. The operation field is related to connection establishment, an address type, a bondable mode, and out of band (OOB) data.

That is, in the LE central control procedure, the EPS client device may transmit, to the EPS server device, a message including the parameter for controlling the operation of the EPS server device. The EPS server device that receives the message may perform an operation for the connection establishment with another EPS server device based on the parameter received from the EPS client device.

FIG. 7 is a diagram illustrating an example of a parameter used in an LE central control procedure.

A parameter (hereinafter, referred to as LE central control procedure parameter) used in the LE central control procedure of FIG. 7 includes field operations, field Peer Device ID, field Expire Time, and field Peer Device IRK (701). The Peer Device IRK field is used for generating a private address of a peer device from a random address.

The operations field is configured by 16 bits. The operations field includes bit Initiator Address, bit Bonding procedure, bit Secure Connection mode, bit Connection establishment procedure, bit Expire Time, and bit Peer Device IRK (702). Respective bit values are defined as follows.

Initiator Address: When the bit is configured to 1, the ESP server device uses the address of the EPS server device as Resolvable Private Address. In other cases, the EPS server device uses the address of the EPS server device as Public or Static Identity Address.

Bonding procedure: When the bit is configured to 1, the EPS server device performs a bonding procedure. In other cases, the EPS server device does not perform the bonding procedure.

Secure Connection mode: When the bit is configured to 1, the EPS server device establishes only an LE Secure Connection. In other cases, the EPS server device does not establish the LE Secure Connection.

Connection establishment procedure: When the bit is configured to 1, the EPS server device performs an automatic connection establishment procedure. In other cases, the EPS server device does not establish the automatic connection establishment procedure.

Expire Time: When the bit is configured to 1, the Expire time field exists in the LE central control procedure parameter. In other cases, the Expire time field exists in the LE central control procedure parameter.

Peer Device IRK: When the bit is configured to 1, the Peer Device IRK field exists in the LE central control procedure parameter. In other cases, the Peer Device IRK field is excluded from the LE central control procedure parameter.

The LE peripheral device control procedure described in FIG. 6 may be supported when the EPS server device supports a peripheral device role. That is, when the EPS server device performs the peripheral device role in the connection procedure with another EPS server device, the EPS client device may perform the LE peripheral device control procedure with the EPS server device.

The LE peripheral device control procedure may include a parameter for controlling the operation of the EPS server device. The parameter may be constituted by four fields. In particular, an operation field defines an operation requested to be performed by the EPS server device. The operation field is related to connection establishment, an address type, a bondable mode, and out of band (OOB) data.

That is, in the LE peripheral device control procedure, the EPS client device may transmit, to the EPS server device, a message including the parameter for controlling the operation of the EPS server device. The EPS server device that receives the message may perform an operation for the connection establishment with another EPS server device based on the parameter received from the EPS client device.

FIG. 8 is a diagram illustrating an example of a parameter used in an LE peripheral device control procedure.

A parameter (hereinafter, referred to as LE peripheral device control procedure parameter) used in the LE peripheral device control procedure of FIG. 8 includes field operations, field Peer Device ID, field Expire Time, and field Peer Device IRK (801).

The operations field is configured by 16 bits. The operations field includes bit Advertiser Address, bit Bondable mode, bit Secure Connection mode, bit Discoverable mode, bit Connectable mode, bit Peer Device ID, bit Expire Time, and bit Peer Device IRK (802). A role of each of the bits is as follows.

Advertiser Address: When the bit is configured to 1, the ESP server device uses the address of the EPS server device as Resolvable Private Address. In other cases, the EPS server device uses the address of the EPS server device as Public or Static Identity Address.

Bondable mode: When the bit is configured to 1, the EPS server device operates in a bondable mode. In other cases, the EPS server device does not operate in the bondable mode.

Secure Connection mode: When the bit is configured to 1, the EPS server device accepts only LE Secure Connection. In other cases, the EPS server device does not accept the LE Secure Connection.

Discoverable mode: When the bit is configured to 1, the EPS server device operates in a limited Discoverable mode. In other cases, the EPS server device does not operate in a general Discoverable mode.

Connectable mode: When the bit is configured to 1, the EPS server device operates in a directed Connectable mode. In other cases, the EPS server device operates in an undirected Connectable mode.

Peer Device ID: When the bit is configured to 1, the Peer Device ID field exists in the LE peripheral device control procedure parameter. In other cases, the Peer Device ID field is excluded from the LE peripheral device control procedure.

Expire Time: When the bit is configured to 1, the Expire time field exists in the LE peripheral device control procedure parameter. In other cases, the Expire time field exists in the LE peripheral device control procedure parameter.

Peer Device IRK: When the bit is configured to 1, the Peer Device IRK field exists in the LE peripheral device control procedure parameter. In other cases, the Peer Device IRK field is excluded from the LE peripheral device control procedure parameter.

FIG. 9 is a flowchart showing an example of an operation of controlling establishment of a connection between two devices by a control device.

FIG. 9 illustrates a control device 901, a first device 902 controlled by the control device 901, and a third device 903 controlled by the control device. The control device 901 may be the EPS client device serving as the connection manager. Further, each of the first device 902 and the second device 903 may be the EPS server device. For convenience of description, an operation of the control device 901 will be primarily described.

The control device 901 receives an advertising message from the first device 902 (S910). The advertising message may include information related to an easy pairing service. The first device 902 then serves as the central device in a connection procedure with the second device 903.

The control device 901 receives an advertising message from the second device 903 (S910). The advertising message may include information related to an easy pairing service. The second device 903 then serves as the peripheral device in a connection procedure with the first device 902.

Next, the control device 901 transmits a connection request message to the first device 902 in order to establish the connection with the first device 902 (S920).

Further, the control device 901 transmits a connection request message to the second device 903 in order to establish the connection with the second device 903 (S920).

The control device 901 may establish the connection with each of the first device 902 and the second device 903 based on the connection request message. The connections with the first device 902 and the second device 903 may be simultaneously established.

Next, the control device 901 controls the second device 903 to serve as the peripheral device so that the first device 902 serves as the central device through an easy pairing (EP) control operation (S931 and S932). That is, the control device 901 may transmit messages including operation codes indicating roles of the first device 902 and the second device 903 to the first device 902 and the second device 903, respectively. Based on the operation codes, the roles of the first device 902 and the second device 903 in the procedure for establishing the connection between the first device 902 and the second device 903 may be determined. Step S931 above may be the LE central control procedure and step S932 above may be the LE peripheral device control procedure.

Although not illustrated in FIG. 9, the control device 901 may indicate the connection with the second device 903 to the first device 902 and indicate the connection with the first device 902 to the second device 903.

Thereafter, the second device 903 transmits an advertising message in order to establish the connection with the first device 902 based on a role configured by the control device 901 (S940). The advertising message may be unicasted to the first device 902 (connectable directed) or broadcasted (connectable undirected advertisement).

Thereafter, the first device 902 scans an advertising packet included in the advertising message received from the second device 903 and requests the connection to the second device 903 to establish the connection with the second device 903 (S950). In order to request the connection to the second device 903, the first device 902 may transmit a connection request message for requesting the connection establishment to the second device 903.

As described in FIG. 9, in order to establish the connection between the first device 902 and the second device 903 which are devices without the UI, the control device 901 which operates as the connection manager is required. The control device 901 may be a device mounted with a screen UI or a touch UI, and the connection is intended to be established between the first device 902 and the second device 903, the control device 901 may not be continuously present. That is, an initial connection may be established between the first device 902 and the second device 903 through the control device 901, and when the initial connection is released, the connection between the first device 902 and the second device 903 should be able to be re-established. In this case, the connection between the first device 902 and the second device 903 needs to be re-established without the control device 901.

FIGS. 10 and 11 are flowcharts showing an example in which a method proposed in the present disclosure is performed.

FIG. 10 illustrates a control device 1001, a first device 1002 controlled by the control device 1001, and a third device 1003 controlled by the control device. The control device 1001 may be the EPS client device serving as the connection manager. Further, each of the first device 1002 and the second device 1003 may be the EPS server device. For convenience of description, an operation of the control device 1001 will be primarily described.

The control device 1001 receives an advertising message from the first device 902 (S1010). The advertising message may include information related to an easy pairing service. The first device 1002 then serves as the central device in a connection procedure with the second device 1003.

The control device 1001 receives an advertising message from the second device 1003 (S1010). The advertising message may include information related to an easy pairing service. The second device 1003 then serves as the peripheral device in a connection procedure with the first device 1002.

Next, the control device 1001 transmits a connection request message to the first device in order to establish the connection with the first device 1002 and the control device 1001 transmits the connection request message to the second device 1003 in order to establish with the connection with the second device 1003 (S1020).

The control device 1001 may establish the connection with each of the first device 1002 and the second device 1003 based on the connection request message. The connections with the first device 1002 and the second device 1003 may be simultaneously established.

Next, the control device 1001 controls the second device 1003 to serve as the peripheral device so that the first device 1003 serves as the central device through an easy pairing (EP) control operation (S1031 and S1032). That is, the control device 1001 may transmit messages including operation codes indicating roles of the first device 1002 and the second device 1003 to the first device 1002 and the second device 1003, respectively. Based on the operation codes, the roles of the first device 1002 and the second device 1003 in the procedure for establishing the connection between the first device 1003 and the second device 1002 may be determined.

Thereafter, the control device 1001 transmits, to the first device 1002, a message including an operation code (S1041 and S1051). When the connection between the first device 1002 and the second device 1003 is released, the operation code may be used for re-establishing the connection between the first device 1002 and the second device 1003.

The operation code may include an operation code indicating to cache an address of the other device in a white list and an operation code indicating to re-establish the released connection when a power of a device is turned on.

Next, the control device 1001 transmits, to the second device 1003, a message including an operation code (S1042 and S1052). When the connection between the first device 1002 and the second device 1003 is released, the operation code may be used for re-establishing the connection between the first device 1002 and the second device 1003.

The operation code may include an operation code indicating to cache an address of the other device in a white list and an operation code indicating to re-establish the released connection when a power of a device is turned on.

Steps S1031, S1041, and S1051 above may be the LE central control procedure and steps S1032, S1042, and S1052 above may be the LE peripheral device control procedure.

Although not illustrated in FIG. 10, the control device 1001 may indicate the connection with the second device 1002 to the first device 1003 and indicate the connection with the first device 1003 to the second device 1002.

Thereafter, the second device 1003 transmits an advertising message in order to establish the connection with the first device 1002 based on a role configured by the control device 1001 (S1070). The advertising message may be unicasted to the first device 902 (connectable directed) or broadcasted (connectable undirected advertisement).

Thereafter, the first device 1002 scans an advertising packet included in the advertising message received from the second device 1003 and requests the connection to the second device 1003 to establish the connection with the second device 1003 (S1070). In order to request the connection to the second device 1003, the first device 1002 may transmit a connection request message for requesting the connection establishment to the second device 1003.

FIG. 11 illustrates an example of an operation in which a connection between a first device 1002 and a second device 1003 is re-established without a control device 1001 after the connection between the first device 1002 and the second device 1003 is released.

In FIG. 11, the connection between the first device 1002 and the second device 1003 is released because powers of the first device 1002 and the second device 1003 are turned off. A case where the powers of the first device 1002 and the second device 1003 are turned off and the connection between the first device 1002 and the second device 1003 are thus released is illustrated, but the present disclosure is not limited thereto, and the connection between the first device 1002 and the second device 1003 may be released because the power of at least one device of the first device 1002 or the second device 1003 is turned off.

The first device and the second device which are in a state in which the power is turned off is powered on at a specific time (S1110). The first device 1002 and the second device 1003 may perform a connection re-establishment procedure based on the operation code indicating to re-establish the released connection when the power of the device is turned on, which is received from the control device 1001.

In this case, when the first device 1002 which is the central device receives the advertising message from the device cached in the white list based on an initiating state filter policy, the first device 1002 may automatically perform an initiate with the device that transmits the advertising message. Further, when the second device (peripheral) 1003 which is the peripheral device receives a connection request from the device cached in the white list based on an advertising state filter policy, the second device 1003 may automatically establish the connection with the device that transmits the connection request message.

The second device 1003 broadcasts the advertising message based on the operation code indicating the role received from the control device 1001 of the device (S1120). The advertising message may include an address of a device that transmits the advertising message. That is, in the case of FIG. 11, the advertising message may include an address of the second device 1003.

Next, the first device 1002 transmits, to the second device 1003, the connection request message based on the operation code indicating the role received from the control device 1001 of the device (S1130). In this case, when the address included in the received advertising message and the address of the second device 1003 cached in the white list of the first device 1002 match each other, based on the initiating state filter policy, the first device 1002 may transmit the connection request message. Further, the connection request message may include an address of the device that transmits the connection request message.

Thereafter, the second device 1003 establishes the connection with the first device 1002 based on the received connection request message. In this case, when the address included in the received connection request message and the address of the first device 1003 cached in the white list of the second device 1002 match each other, based on the advertising state filter policy, the second device 1002 may establish the connection with the first device 1002 without an additional procedure for identifying the first device 1002.

The LE central control procedure described in FIGS. 10 and 11 may be supported when the EPS server device supports a central role. That is, when the EPS server device performs the central role in the connection procedure with another EPS server device, the EPS client device may perform the central control procedure with the EPS server device.

The LE central control procedure may include a parameter for controlling an operation of the EPS server device. The parameter may be constituted by four fields. In particular, an operation field defines an operation requested to be performed by the EPS server device. The operation field is related to connection establishment, an address type, a bondable mode, and out of band (OOB) data.

FIG. 12 illustrates another example of an LE central control procedure parameter.

The operations field of the LE central control procedure parameter illustrated in FIG. 12 further includes bit Save Peer Address to Whitelist and bit Auto Connect when Power On in addition to the bit described in FIG. 7. A bit other than the further included bit will be skipped. A role of each bit is as follows.

Save Peer Address to Whitelist: When the bit is configured to 1, the EPS server device (central) caches Peer Device Address received from the other EPS server device (peripheral) in Whitelist thereof. In other cases, Peer Device Address which the EPS server device (central) receives from the other EPS server device (peripheral) is not cached in the Whitelist thereof.

Auto Connect when Power On: When the bit is configured to 1, an initial easy pairing configuration is finished and when a subsequent connection manager does not exist, the EPS server device operates as the central device. When the power is turned on, the central device receives the advertising message from a peer device in the white list, and automatically requests the connection to the peer device. In other cases, when the connection manager exists, an operation defined in a 0-3-th bit of FIG. 12 is performed.

The LE peripheral device control procedure described in FIGS. 10 and 11 may be supported when the EPS server device supports a peripheral device role. That is, when the EPS server device performs the peripheral device role in the connection procedure with another EPS server device, the EPS client device may perform the LE peripheral device control procedure with the EPS server device.

The LE peripheral device control procedure may include a parameter for controlling the operation of the EPS server device. The parameter may be constituted by four fields. In particular, an operation field defines an operation requested to be performed by the EPS server device. The operation field is related to connection establishment, an address type, a bondable mode, and out of band (OOB) data.

FIG. 13 is a diagram illustrating another example of an LE peripheral device control procedure parameter.

The operations field of the LE peripheral device control procedure parameter illustrated in FIG. 13 further includes bit Save Peer Address to Whitelist and bit Auto Connect when Power On in addition to the bit described in FIG. 8. A bit other than the further included bit will be skipped. A role of each bit is as follows.

Save Peer Address to Whitelist: When the bit is configured to 1, the EPS server device (peripheral) caches Peer Device Address received from the other EPS server device (central) in Whitelist thereof. In other cases, Peer Device Address which the EPS server device (peripheral) receives from the other EPS server device (central) is not cached in the Whitelist thereof.

Auto Connect when Power On: When the bit is configured to 1, an initial easy pairing configuration is finished and when a subsequent connection manager does not exist, the EPS server device operates as the peripheral device. When the power is turned, the central device broadcasts the advertising message and when the central device receives the connection request from the peer device, the central device automatically establishes the connection with the peer device (central). In other cases, when the connection manager exists, an operation defined in a 0-4-th bit of FIG. 13 is performed.

FIG. 14 is a diagram illustrating an example of a method for controlling establishment of a connection between devices by a control device proposed in the present disclosure.

The method proposed in the present disclosure may be applied to a scenario that makes a psychedelic lighting by connecting a party speaker (one body) and LED bulbs.

FIG. 14 illustrates a case where a plurality of LED bulbs is connected to the party speaker to implement the psychedelic lighting.

The connection between the party speaker and the LED bulb may be controlled by the control device, and FIG. 14 corresponds to a case where the control device is a smartphone. Further, in FIG. 14, the party speaker is the central device, and the EPS server is the peripheral device. It is assumed that the party speaker and the LED bulb have no UI.

In FIG. 14(b), since the party speaker and the LED bulb have no user interface (UI), an initial connection may be established between the party speaker and the LED bulb through the smartphone which is the control device. In a procedure of establishing the initial connection of the party speaker and the LED bulb, the control device may indicate operations required for connection re-establishment to the party speaker and the LED bulb through the operation described in FIG. 10.

In FIG. 14(b), after the connection between the party speaker and the LED bulb is established, the connection may be released.

FIG. 14(c) illustrates a case where the smartphone which is the control device is not present when the connection between the party speaker and the LED bulb is re-established. In this case, in the initial connection establishment procedure of FIG. 14(b), the connection between the party speaker and the LED bulb may be established without the control device based on the operations which the control device indicates to the party speaker and the LED bulb.

FIG. 15 is a flowchart showing an example of a control device operation of performing a method for controlling a connection between a first device and a second device by a control device proposed in the present disclosure.

More specifically, in the method for controlling, by the control device, the connection between the first device and the second device by using the short-range wireless communication, the control device transmits, to the first device, a first message including a first operation code for re-establishment after an initial connection between the first device and the second device is established (S1510).

Here, the first operation code includes a first code indicating to cache an address of the second device in a first white list including addresses of devices connected to the first device at least once or more.

Further, the first operation code may include a third code indicating to perform the re-connection when the power of the first device is turned on, and the second operation code may further include a fourth code indicating to perform the re-connection when the power of the second device is turned on.

Here, when bit values of the first code and the second code are 1, the first code and the second code may indicate to cache the address of the other device in the white list, and when the bit values of the first code and the second code are 0, the first code and the second code may indicate not to cache the address of the other device in the white list.

Next, the control device transmits, to the second device, a second message including a second operation code for the re-connection (S1520).

Here, the second operation code includes a second code indicating to cache the address of the first device in a second white list including addresses of devices connected to the second device at least once or more.

Next, the control device indicates to establish the connection between the first device and the second device to the first device and the second device (S1530).

In this case, when the connection after the initial connection is released, each of the first white list and the second white list includes addresses of devices connected without the control device.

Additionally, the control device may transmit, to the first device, a third message including a third operation code indicating the role of the first device for establishing the connection, and transmits, to the second device, a fourth message including a fourth operation code indicating the role of the second device for establishing the connection.

Here, when the role of the first device is the central device, if the bit value of the third code is 1, the third code may indicate to request the connection to the second device without the control device when the first device receives an advertising message for establishing the connection between the first device and the second device from the second device after the power of the first device is changed from the off state to the on state. Further, when the bit value of the third code is 0, the third code may indicate the first device to perform a connection establishment procedure with the second device by the control by the control device after the power of the first device is changed from the off state to the on state.

Further, when the role of the second device is the peripheral device, if the bit value of the fourth code is 1, the fourth code may indicate i) the second device to broadcast the advertising message for establishing the connection between the first device and the second device, and ii) to form the connection with the first device without the control device when receiving the connection request from the first device after the power of the second device is changed from the off state to the on state. Further, when the bit value of the fourth code is 0, the fourth code may indicate the second device to perform the connection establishment procedure with the first device by the control by the control device after the power of the second device is changed from the off state to the on state.

Additionally, the control device may receive a first advertising message in order to determine the role of the first device from the first device, receive a second advertising message in order to determine the role of the second device from the second device, and determine the role of the first device and the role of the second device based on the first advertising message and the second advertising message. In this case, the first advertising message may include capability information of the first device, and the second advertising message may include capability information of the second device.

Operations additionally described after step S1530 above may be performed before step S1510, between step S1510 and step S1530, or after step S1530.

FIG. 16 is a flowchart showing an example of a first device operation of performing a method for being controlled with a connection between a first device and a second device proposed in the present disclosure.

More specifically, in the method for controlling, by the control device, the connection between the first device and the second device by using the short-range wireless communication, the first device receives, from the control device, a first message including a first operation code for re-connection after the initial connection between the first device and the second device is established (S1610).

Here, the first operation code includes a first code indicating to cache the address of the second device in a first white list including addresses of devices connected to the first device at least once or more.

Next, the first device is indicated with establishment of a connection between the first device and the second device, from the control device (S1620).

Next, the first device establishes a connection with the second device based on the indication (S1630).

When the connection after the initial connection is released, the first white list includes addresses of devices connected without the control device.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

The invention claimed is:

1. A method for a control device to control a connection between a first device and a second device using short-range wireless communication, the method comprising:
   transmitting, to the first device, a first message including a first operation code for reconnection after an initial connection between the first device and the second device is established,
   wherein the first operation code includes a first code instructing storage of an address of the second device in a first white list including addresses of devices connected to the first device at least once;
   transmitting, to the second device, a second message including a second operation code for the reconnection,
   wherein the second operation code includes a second code instructing storage of an address of the first device in a second white list including addresses of devices connected to the second device at least once; and
   instructing the first device and the second device to form a connection between the first device and the second device,
   wherein each of the first white list and the second white list includes addresses of devices connected without the control device when a connection is released after the initial connection.

2. The method of claim 1,
   wherein the first operation code includes a third code instructing to perform the reconnection when a power of the first device is turned on,
   wherein the second operation code further includes a fourth code instructing to perform the reconnection when a power of the second device is turned on.

3. The method of claim 2,
   transmitting, to the first device, a third message including a third operation code instructing a role of the first device for establishing the connection; and
   transmitting, to the second device, a fourth message including a fourth operation code instructing a role of the second device for establishing the connection.

4. The method of claim 3,
   wherein based on that the role of the first device is a central device and based on that a bit value of the third code is 1, the third code instructs the first device to request a connection to the second device based on that the first device receives an advertisement message for establishing the connection between the first device and the second device from the second device after the power of the first device is changed from the OFF state to the ON stat, and
   wherein based on that the role of the first device is the central device and based on that the bit value of the third code is 0, the third code instructs the first device to perform a connection establishment procedure with the second device under a control of the control device after the power of the first device is changed from the OFF state to the ON state.

5. The method of claim 3,
wherein based on that the role of the second device is a peripheral device and based on that a bit value of the fourth code is 1, the fourth code instructs the second device to (i) broadcast an advertisement message for a connection establishment between the first device and the second device and (ii) establish the connection with the first device when receiving a connection request from the first device, after the power of the second device is changed from an OFF state to an ON state, and
wherein based on that the role of the second device is a peripheral device and based on that a bit value of the fourth code is 0, the fourth code instructs the second device to perform a connection establishment procedure with the first device under a control of the control device, after the power of the second device is changed from the OFF state to the ON state.

6. The method of claim 3, further comprising:
receiving, from the first device, a first advertisement message to determine the role of the first device;
receiving, from the second device, a second advertisement message to determine the role of the second device; and
determining the role of the first device and the role of the second device based on the first advertisement message and the second advertisement message,
wherein the first advertisement message includes capability information of the first device, and
wherein the second advertisement message includes capability information of the second device.

7. The method of claim 1,
wherein based on bit values of the first code and the second code are 1, the first code and the second code instruct a device to store an address of a counterpart device in a white list,
wherein based on that bits of the first code and the second code are 0, the first code and the second code instruct a device not to store an address of a counterpart device in a white list.

8. A method for a control device to control a connection between a first device and a second device using short-range wireless communication, the method performed by the first device comprising:
receiving, from the control device, a first message including a first operation code for reconnection after an initial connection between the first device and the second device is established,
wherein the first operation code includes a first code instructing storage of an address of the second device in a first white list including addresses of devices connected to the first device at least once;
receiving, from the control device, an instruction to establish a connection between the first device and the second device; and
establishing the connection with the second device based on the instruction,
wherein the first white list includes addresses of devices connected without the control device when the connection is released after the initial connection.

9. A control device for controlling the connection between the first device and the second device using short-range wireless communication, the control device comprising:
a transmitter for transmitting a radio signal;
a receiver for receiving the radio signal; and
a processor operatively connected to the transmitter and the receiver,
wherein the processor is configured to control:
the transmitter to transmit, to the first device, a first message including a first operation code for reconnection after an initial connection between the first device and the second device is established,
wherein the first operation code includes a first code instructing storage of an address of the second device in a first white list including addresses of devices connected to the first device at least once;
the transmitter to transmit, to the second device, a second message including a second operation code for the reconnection,
wherein the second operation code includes a second code instructing storage of an address of the first device in a second white list including addresses of devices connected to the second device at least once; and
instruct the first device and the second device to form a connection between the first device and the second device,
wherein each of the first white list and the second white list includes addresses of devices connected without the control device when a connection is released after the initial connection.

10. A first device being controlled on a connection between the first device and a second device using short-range wireless communication, the first device comprising:
a transmitter for transmitting a radio signal;
a receiver for receiving the radio signal; and
a processor operatively connected to the transmitter and the receiver,
wherein the processor is configured to control:
the receiver to receive, from the control device, a first message including a first operation code for reconnection after an initial connection between the first device and the second device is established,
wherein the first operation code includes a first code instructing storage of an address of the second device in a first white list including addresses of devices connected to the first device at least once;
the receiver to receive, from the control device, an instruction to establish a connection between the first device and the second device; and
establish the connection with the second device based on the instruction, wherein the first white list includes addresses of devices connected without the control device when the connection is released after the initial connection.

* * * * *